United States Patent
Morris

(10) Patent No.: US 9,986,408 B1
(45) Date of Patent: May 29, 2018

(54) METHOD FOR PROVIDING A COHERENT NETWORK OF APPS FOR MOBILE DEVICES

(71) Applicant: Charles Albert Morris, Maquoketa, IA (US)

(72) Inventor: Charles Albert Morris, Maquoketa, IA (US)

(*) Notice: Subject to any disclaimer, the term of this patent is extended or adjusted under 35 U.S.C. 154(b) by 151 days.

(21) Appl. No.: 14/846,788

(22) Filed: Sep. 6, 2015

(51) Int. Cl.
 *G06F 15/173* (2006.01)
 *H04W 4/00* (2018.01)
 *H04L 29/08* (2006.01)

(52) U.S. Cl.
 CPC .............. *H04W 4/60* (2018.02); *H04L 67/10* (2013.01); *H04L 67/16* (2013.01); *H04L 67/18* (2013.01); *H04W 4/003* (2013.01)

(58) Field of Classification Search
 None
 See application file for complete search history.

(56) References Cited

U.S. PATENT DOCUMENTS

| | | | | |
|---|---|---|---|---|
| 9,152,694 B1 * | 10/2015 | Padidar | | G06F 17/30598 |
| 2012/0221384 A1 | 8/2012 | Avadhanam | | |
| 2013/0091557 A1 * | 4/2013 | Gurrapu | | H04W 4/003 726/5 |
| 2013/0332442 A1 * | 12/2013 | Liu | | G06F 17/30864 707/709 |
| 2014/0040231 A1 * | 2/2014 | Lin | | G06F 17/30867 707/708 |
| 2015/0006328 A1 * | 1/2015 | Yoon | | G06Q 30/0629 705/26.64 |
| 2015/0095161 A1 * | 4/2015 | Goel | | G06Q 30/0267 705/14.64 |
| 2016/0328403 A1 * | 11/2016 | Park | | G06F 17/30864 |
| 2016/0378967 A1 * | 12/2016 | Li | | G06F 21/36 726/19 |
| 2017/0091208 A1 * | 3/2017 | Quan | | G06F 17/30091 |

* cited by examiner

*Primary Examiner* — Kenny S Lin

(57) ABSTRACT

A generator for mobile apps provides an easy to use template for creating multiple apps that all share a coherent navigation system and infrastructure in order that all of the apps function as a network that can be accessed by installing just one of the apps. Multiple users of the generator create their own apps and offer the apps to users of mobile computerized devices. When a user of a mobile device downloads just one of the apps, they are provided with access to the entire network of apps, without having to download and install each of the apps separately. This is particularly useful for location-based apps, content apps, and commerce apps.

20 Claims, 10 Drawing Sheets

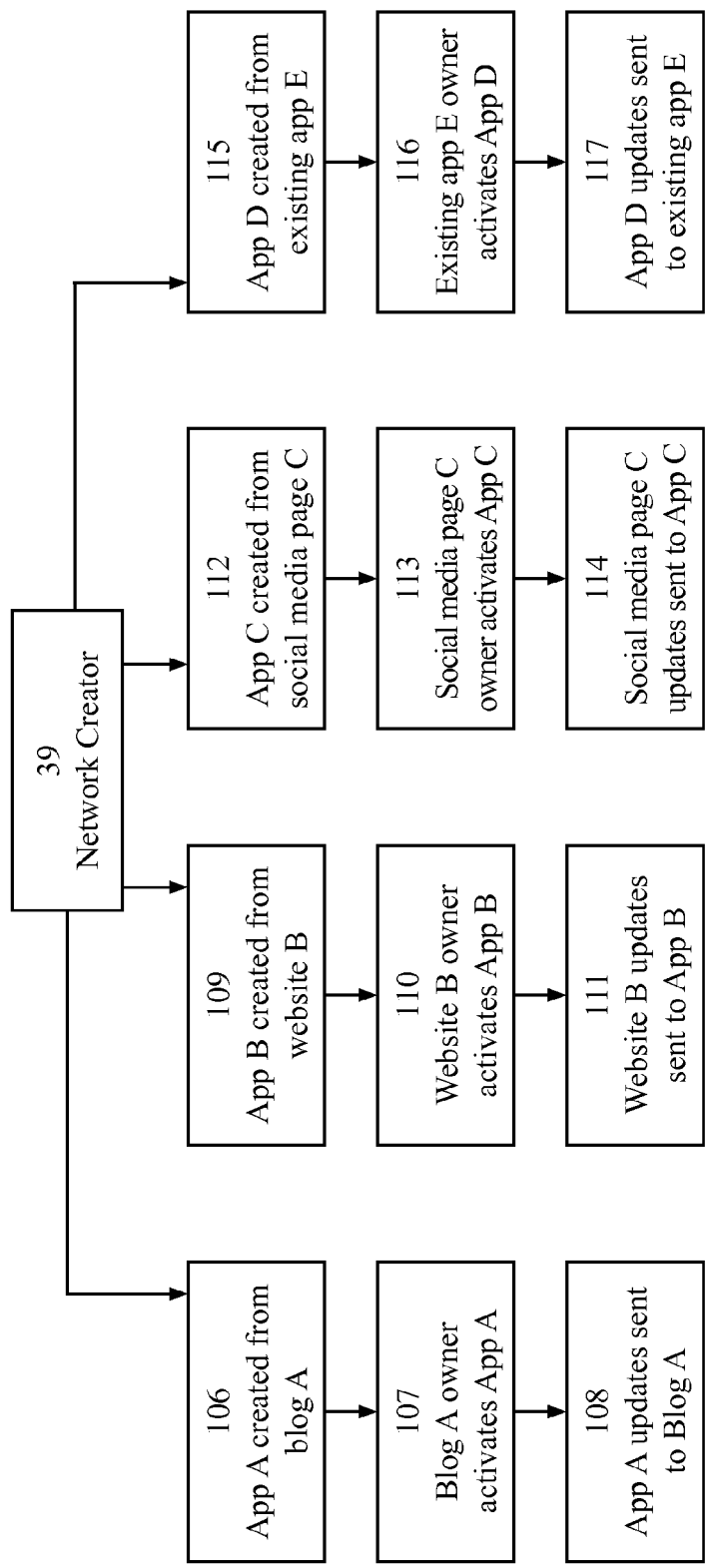

METHOD FOR PROVIDING A COHERENT NETWORK OF APPS FOR MOBILE DEVICES

BACKGROUND OF THE INVENTION

The present invention relates to a network of related apps for mobile computerized devices.

Numerous embodiments of groupings of related apps exist in the prior art such as the categories of apps to be found on Apple's App Store and on Google Play. However, each of these groupings of related apps requires the user to download each individual app in order to use them. US patent application US20120221384A1 provides a collection of apps to which a user can subscribe, but requires the user to download and install each desired app within the collection in order to use it. Many apps, such as TripAdvisor, include information relevant to many different locations and topics, but they do not allow individual venues, organizations, and individuals to offer their own individually branded and individually controlled apps, nor do they create a coherent network of such individually branded and individually controlled apps.

It would be advantageous to provide coherent networks of related apps that allow the user to download just one of the apps within the network in order to access the content of all of the related apps. In particular, it would be advantageous to provide a network of apps that allow a user to travel from region to region and instantly access apps that are controlled by and updated by entities located within those regions. By providing an infrastructure for the simple creation of apps to all such entities, including the ability to constantly update content, sales, and specials, regional venues will be empowered and users of the app network will find more relevant information.

It would also be advantageous to provide coherent networks of related apps that are each dedicated to a particular topic and are edited by members in a wiki fashion. A mobile empowered network of wiki apps would allow for richer content added directly from locations related to each topic.

It would also be advantageous to provide coherent networks of related apps that are automatically generated from existing apps, websites, social media pages, and blogs. The owners of these existing platforms could choose to activate, publish, and edit the new apps. This would be a simple choice on the part of these owners to have an app that is part of a coherent network that would give more exposure to their content, which could be automatically updated when these owners make changes to the existing apps, websites, social media pages, and blogs.

It would also be advantageous to provide coherent networks of related apps that are each associated with a specific commercial item that can be tracked with the permission of the commercial item's owner and analyzed throughout its life cycle from production through its sale to its recycling and disposal. Such apps could also provide remote control of the commercial items, and critical information concerning the item's repair, upkeep, recycling, and disposal.

It would also be advantageous to provide a coherent network of apps with sub-networks that are devoted to particular types of apps.

BRIEF SUMMARY OF THE INVENTION

It is an object of the invention to provide a network of mobile apps and a generator for mobile apps that offers an easy-to-use template for creating multiple apps that all share a coherent user interface and infrastructure. Multiple users of the generator will create their own apps and offer the apps to users of mobile computerized devices. When a user of a mobile device downloads one of the apps, they are provided with access to all of the apps that were created with the generator, without having to download and install each of the apps separately. This is particularly useful for locally relevant apps, because a user of a mobile device who installs just one of the apps can discover a network of related apps as he or she travels to new areas.

It is a further object of the invention to provide a form of the network of mobile apps and generator for mobile apps that is specifically designed for cultural entities. State-run cultural organizations will be invited to create their own cultural apps to be a part of a national or global network. Whenever a user of one state-run app travels to another state that has a state-run app, the new state's app will be activated on the user's mobile device. The state-run cultural organizations will each be free to invite local and regional cultural entities to create their own apps to be featured within the network, and these local and regional entities will be free to invite businesses, organizations, and individuals within their communities to create their own culture-related apps to be featured within the network. The state-run, local, and regional apps will offer distilled highlights of all cultural venues within their territories that they choose to feature. The apps maintained by the individual venues will include up-to-date and detailed information, and will allow for reservations, sales, and donations. Users of the app network will be encouraged to tip their favorite venues, and these tips will be used to rate the venues.

It is a further object of the invention to provide a form of the network of mobile apps that includes a program that can import existing apps, websites, blogs, and social media pages to create new apps that are each compatible with the network. Owners of these existing apps, websites, blogs, and social media pages can choose to activate these apps within the network, and choose to update these new apps through an interface provided by the network, or they can choose to update these new apps by simply making changes to their existing apps, websites, blogs, or social media pages. Owners of these existing apps, websites, blogs, and social media pages can also choose to allow the network to update their existing apps, websites, blogs, and social media pages based on updates to their new app. Users of the app network will be encouraged to tip their favorite apps, and these tips will be used to rate the apps.

It is a further object of the invention to provide a form of the network of mobile apps that includes multiple apps created by an organization, with each app declared to be relevant to at least one of the following: a particular place, a particular time period, a particular time period as related to a particular place, a particular person, a particular group of people, a particular organization, a particular object, a particular consumer item, a particular natural organism, a particular species of natural organisms, a particular group of natural organisms, a particular aspect of the natural world, a particular region, a particular city, a particular state, a particular nation, a particular activity, a particular business, a particular aspect of politics, a particular aspect of human culture, a particular aspect of human biology, a particular aspect of human psychology, a particular aspect of human spirituality, and a particular form of media. People are invited to become members of the network, to add relevant content to any of the apps, and to edit each others' contributions.

It is a further object of the invention to provide a form of the network of mobile apps that includes multiple apps created specifically for individual items for sale and individual items that have been purchased. Each item is given its own app, which can be accessed by a producer, a packager, a shipper, a wholesaler, a seller, a deliverer, an owner, a repairer, a recycler, and a disposer. Updates can be added by the one in possession of the item, and functionality can be programmed into the item to interact with the app, allowing the app to control the item, and allowing the item's own diagnostics to report on its own condition. Information concerning the location, use, and status of the item is reported to a database through automatic updates and through updates provided by the one(s) in possession of the item. These updates can be blocked by the one(s) in possession of the item. Comparative information is gathered from multiple related or identical items.

It is a further object of the invention to provide a form of the network of mobile apps that includes sub-networks of app that are devoted to particular types of apps.

BRIEF DESCRIPTION OF THE SEVERAL VIEWS OF THE DRAWING

The present invention will be more fully understood by reference to the following detailed descriptions thereof when read in conjunction with the attached drawings, and wherein:

FIG. 10 shows a block diagram of an even yet further still modified method for providing a coherent network of apps for mobile computerized devices in which apps that are compatible with the network are created from existing apps, websites, social media pages, and blogs.

DETAILED DESCRIPTION OF THE INVENTION

Figure 1:
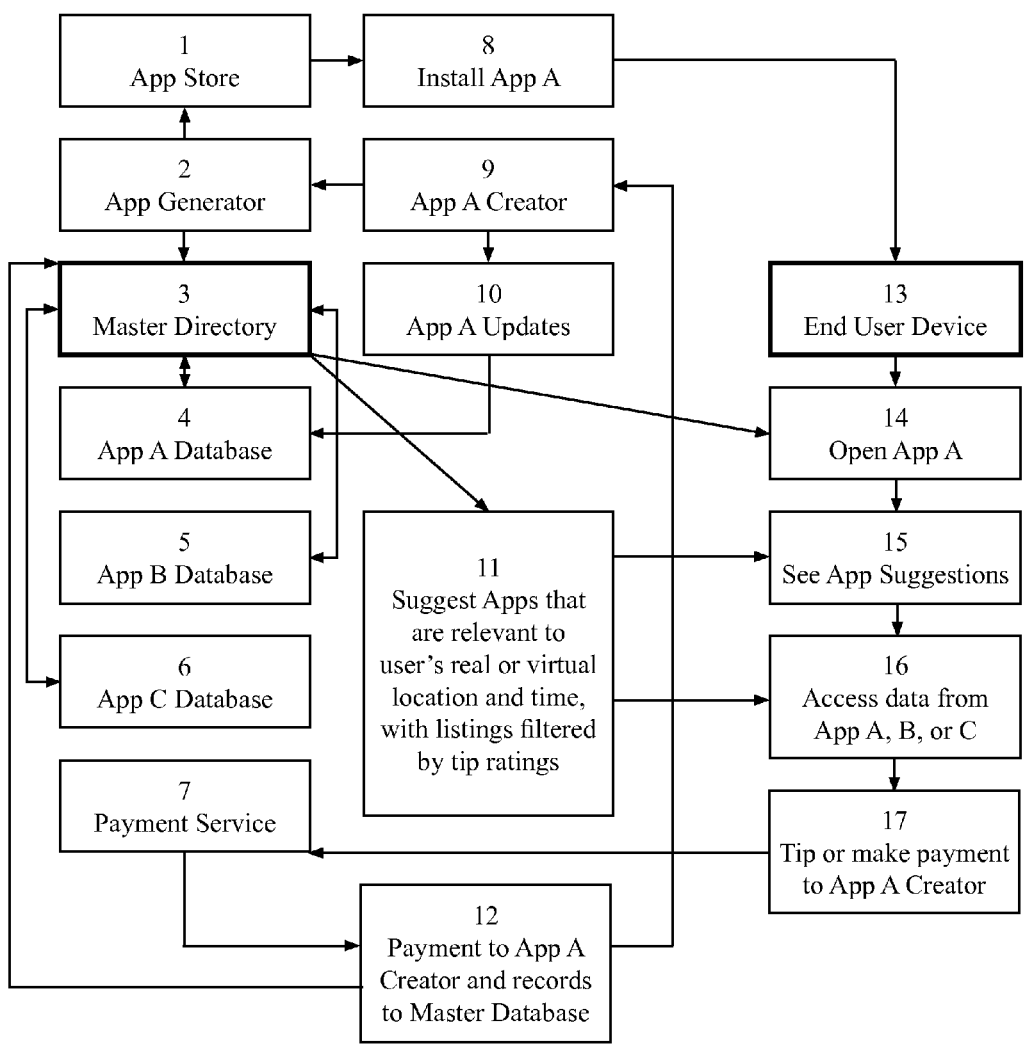
FIG. 1 shows a block diagram of a preferred method for providing a coherent network of apps for mobile computerized devices.
Figure 2:
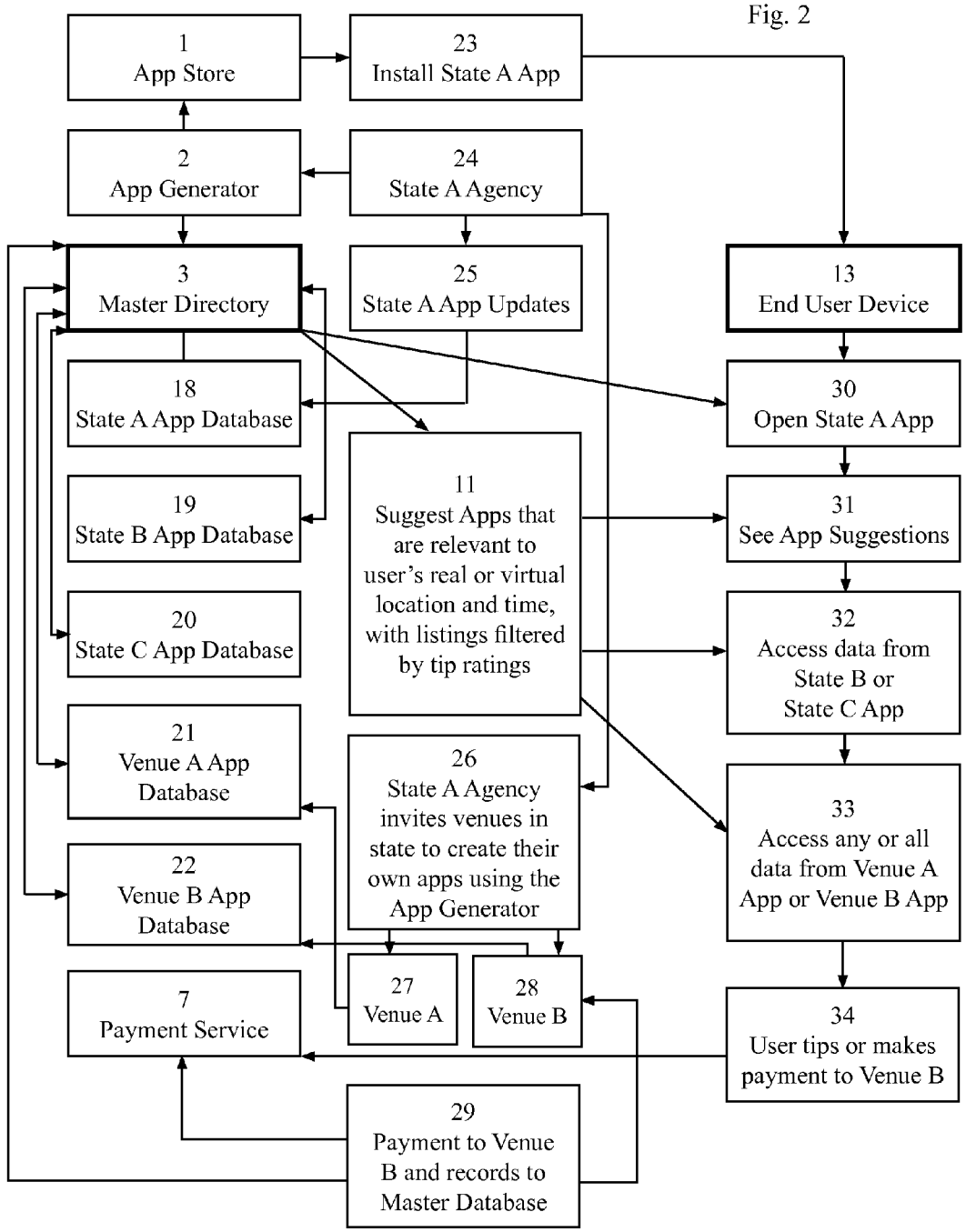
FIG. 2 shows a block diagram of a modified method for providing a coherent network of apps for mobile computerized devices in which multiple states create apps within the network and invite venues within their states to create apps within the network.
Figure 3:
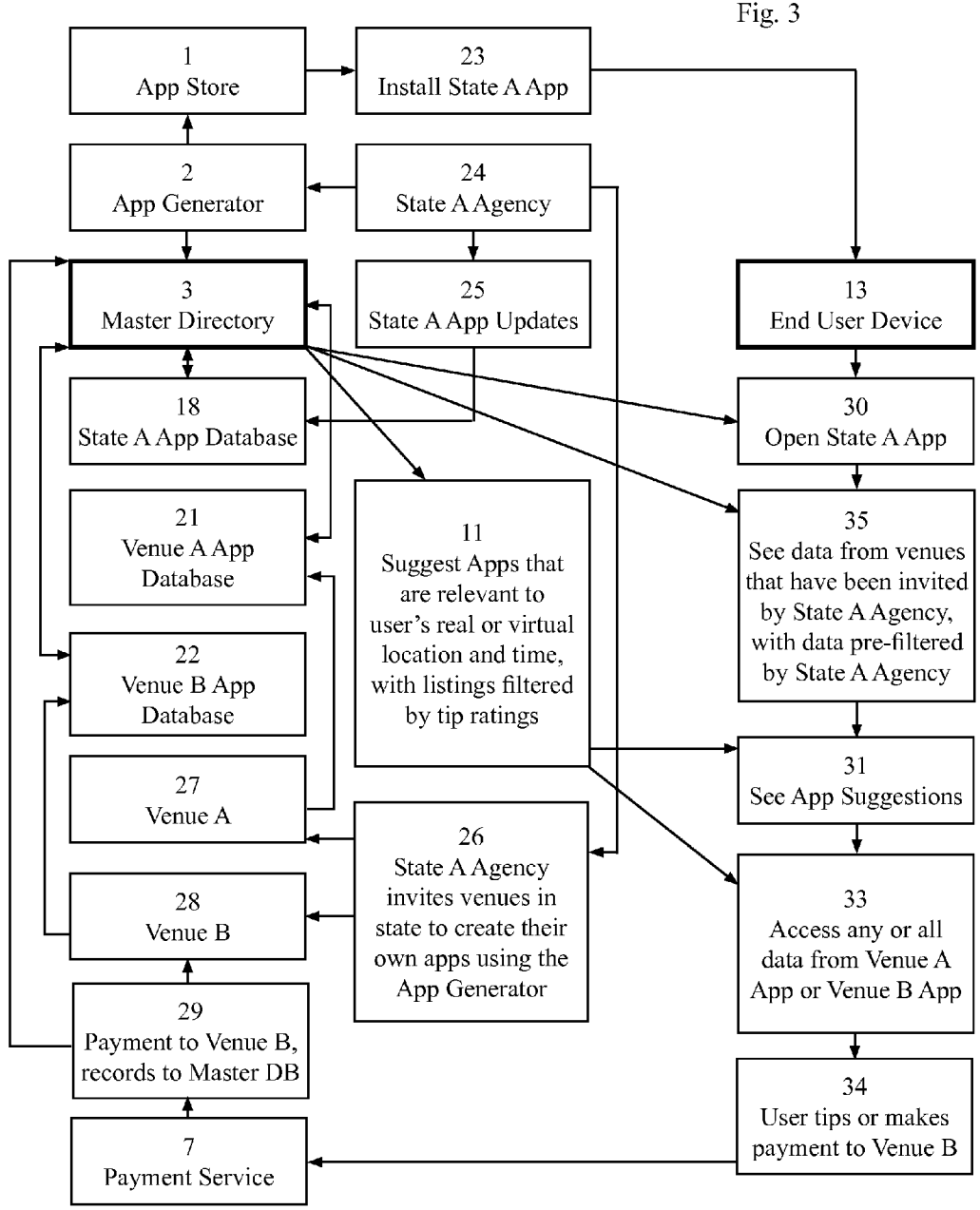
FIG. 3 shows a block diagram of a further modified method for providing a coherent network of apps for mobile computerized devices in which a single state agency creates an app and invites venues within the states to create apps within a statewide network.
Figure 4:
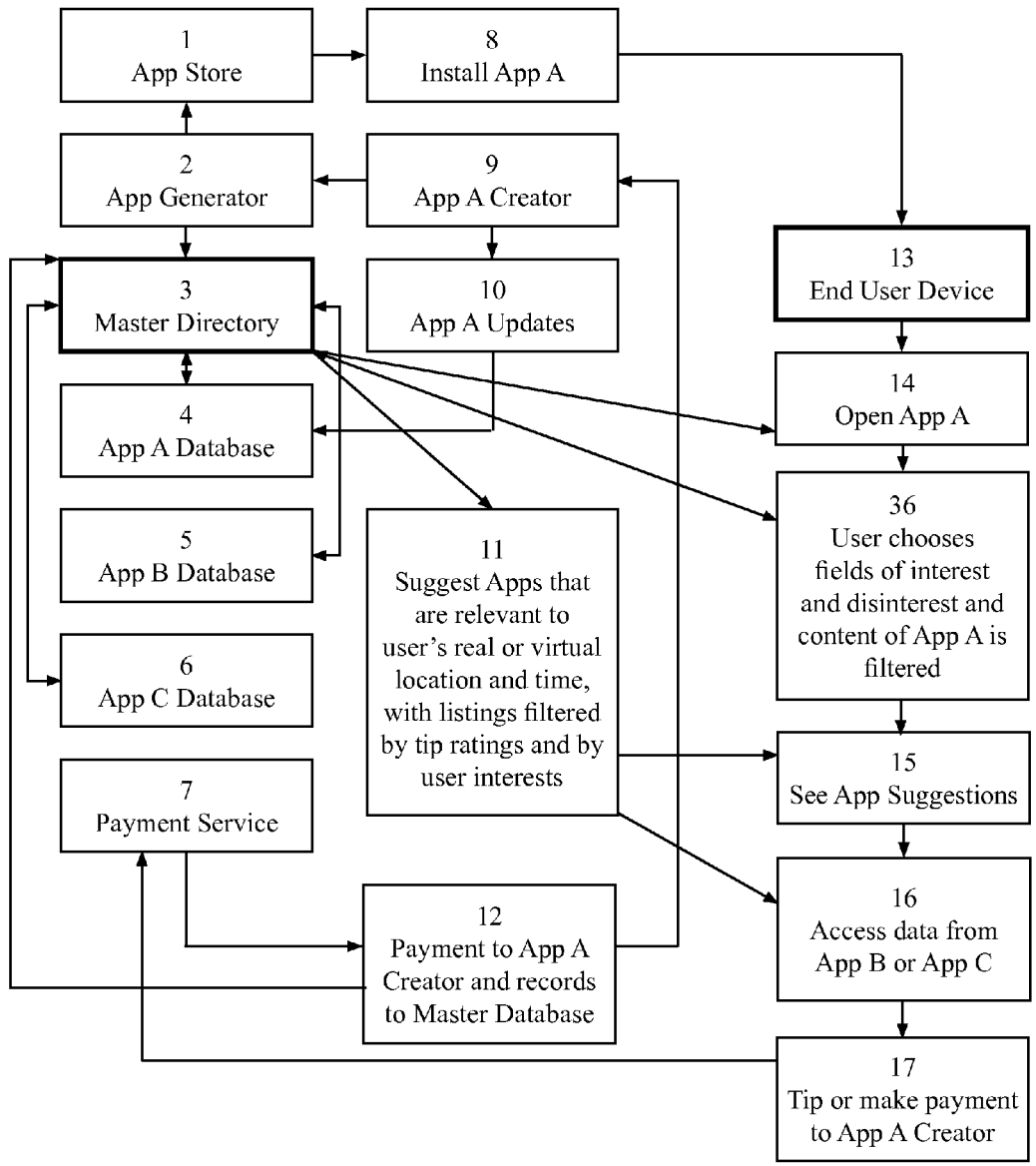
FIG. 4 shows a block diagram of a still further modified method for providing a coherent network of apps for mobile computerized devices in which the a user of the network chooses fields of interest and disinterest in order to filter what sort of listings are suggested.
Figure 5:
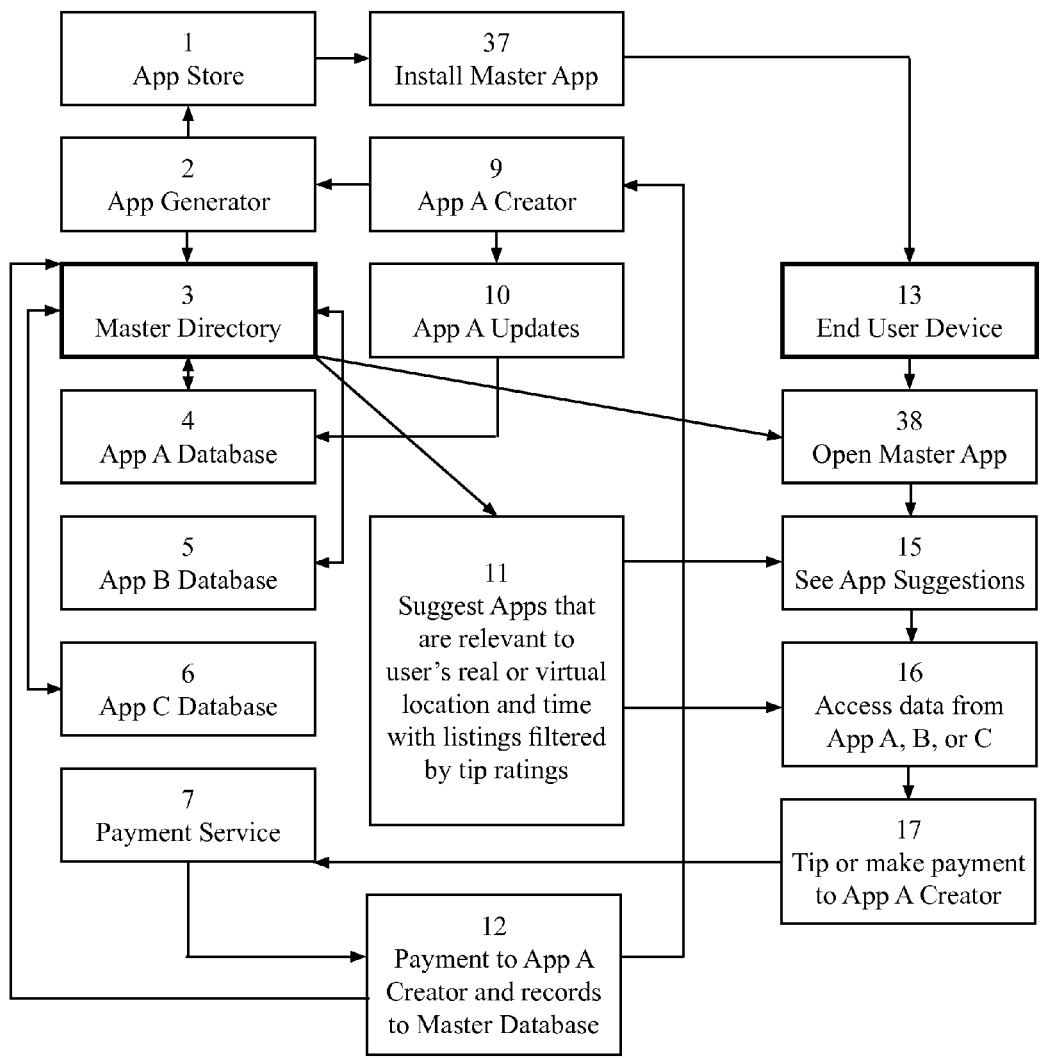
FIG. 5 shows a block diagram of a yet still further modified method for providing a coherent network of apps for mobile computerized devices in which a master app for the network is installed and opened in order to have an overview of the entire network.
Figure 6:
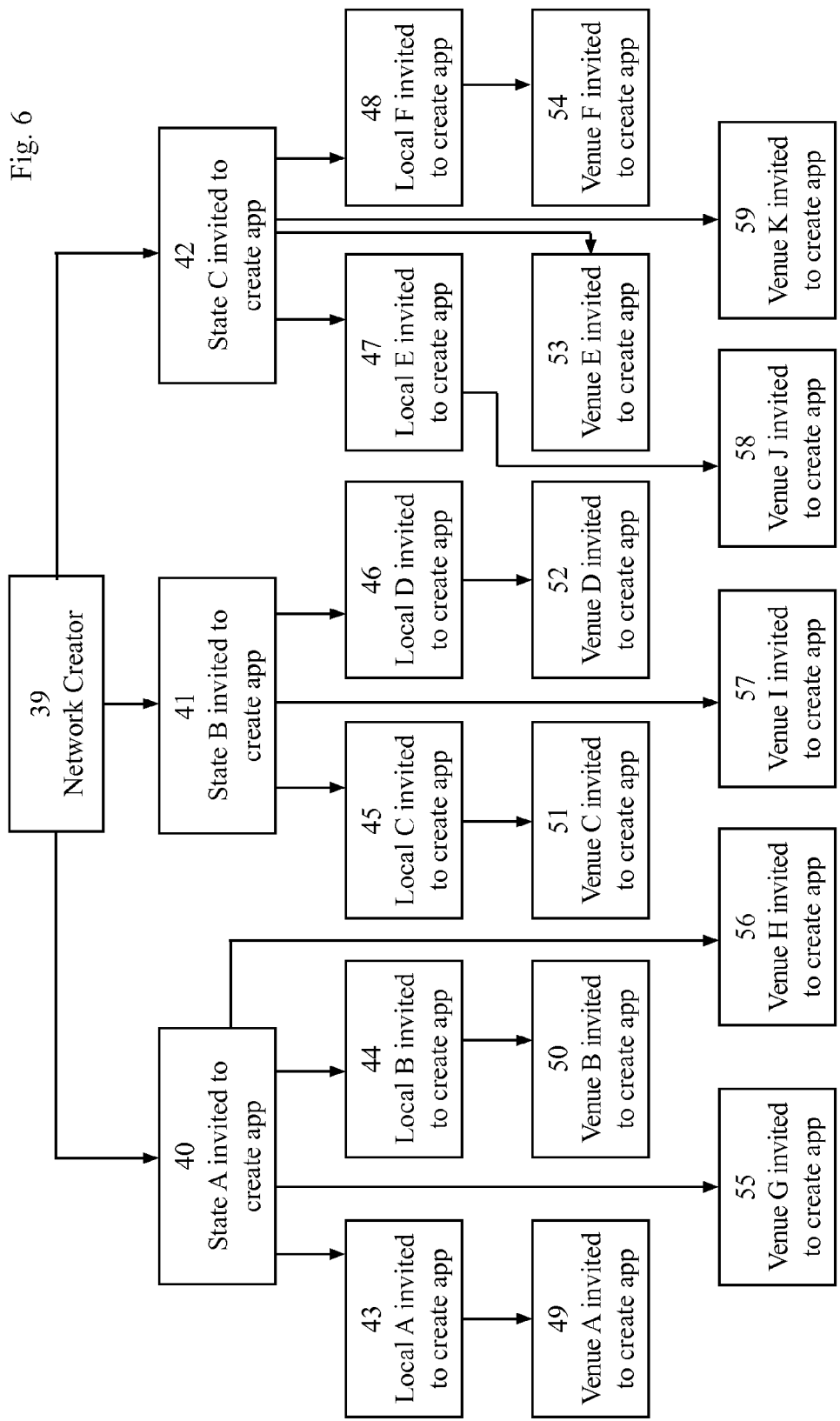
FIG. 6 shows a block diagram of a even still further modified method for providing a coherent network of apps for mobile computerized devices in which multiple states are invited to create apps within the network, local governments and individual venues are invited by the state governments to create apps within the network, and local governments invite individual venues to create apps within the network.
Figure 7:
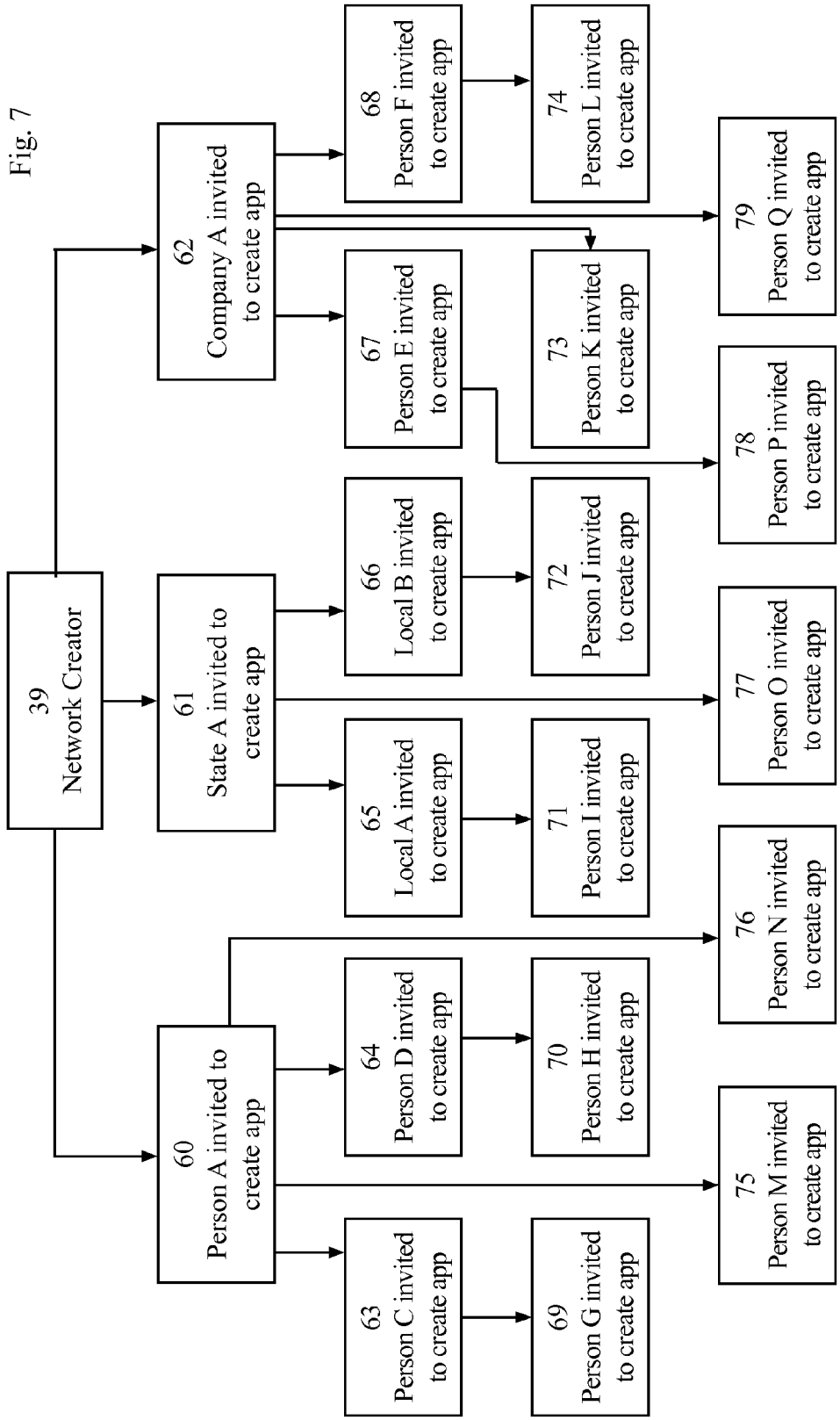
FIG. 7 shows a block diagram of a even yet still further modified method for providing a coherent network of apps for mobile computerized devices in which multiple people, governments, and organizations are invited to create apps within the network, and all who have created apps within the network can invite others to create apps within the network.
Figure 8:
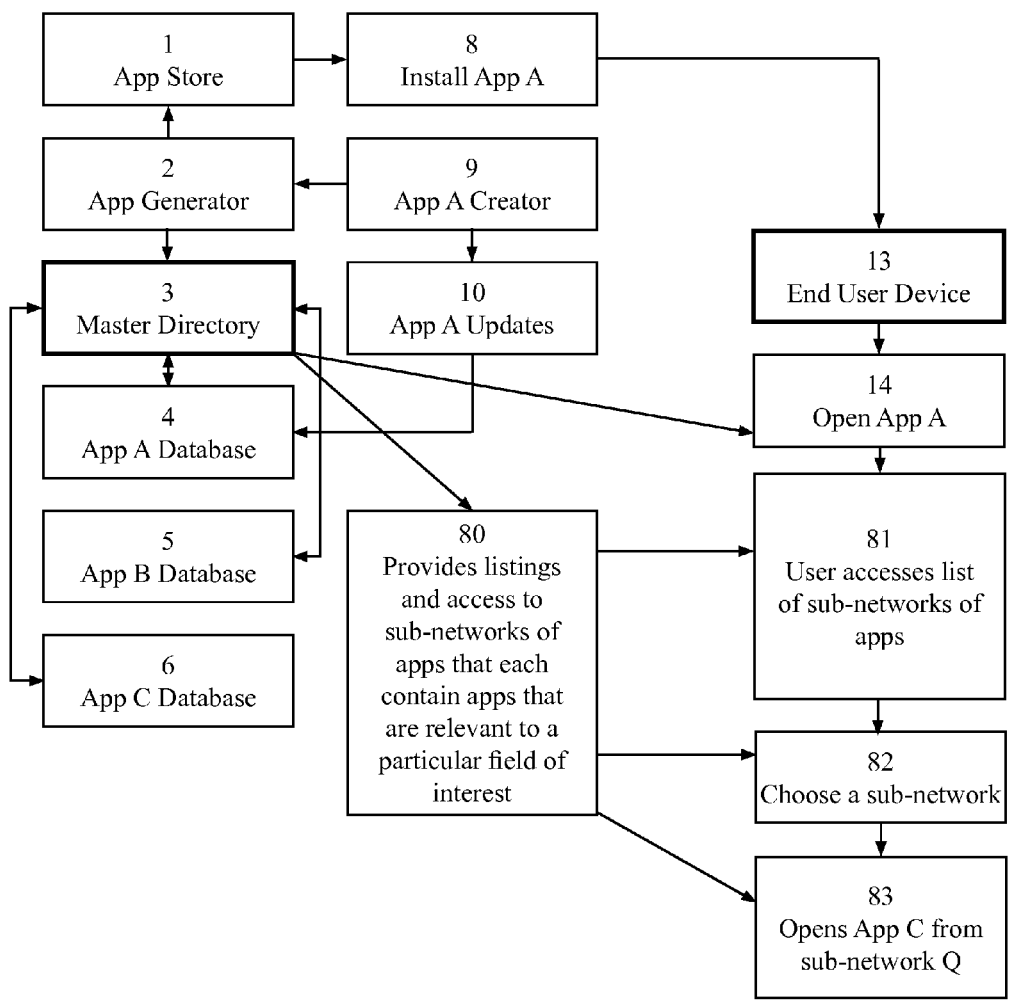
FIG. 8 shows a block diagram of an even yet further still modified method for providing a coherent network of apps for mobile computerized devices in which a user of one app within the network opens a list of sub-networks of apps that each contains apps that are relevant to a particular field of interest. Any app within any sub-network can then be opened by the user.
Figure 9:
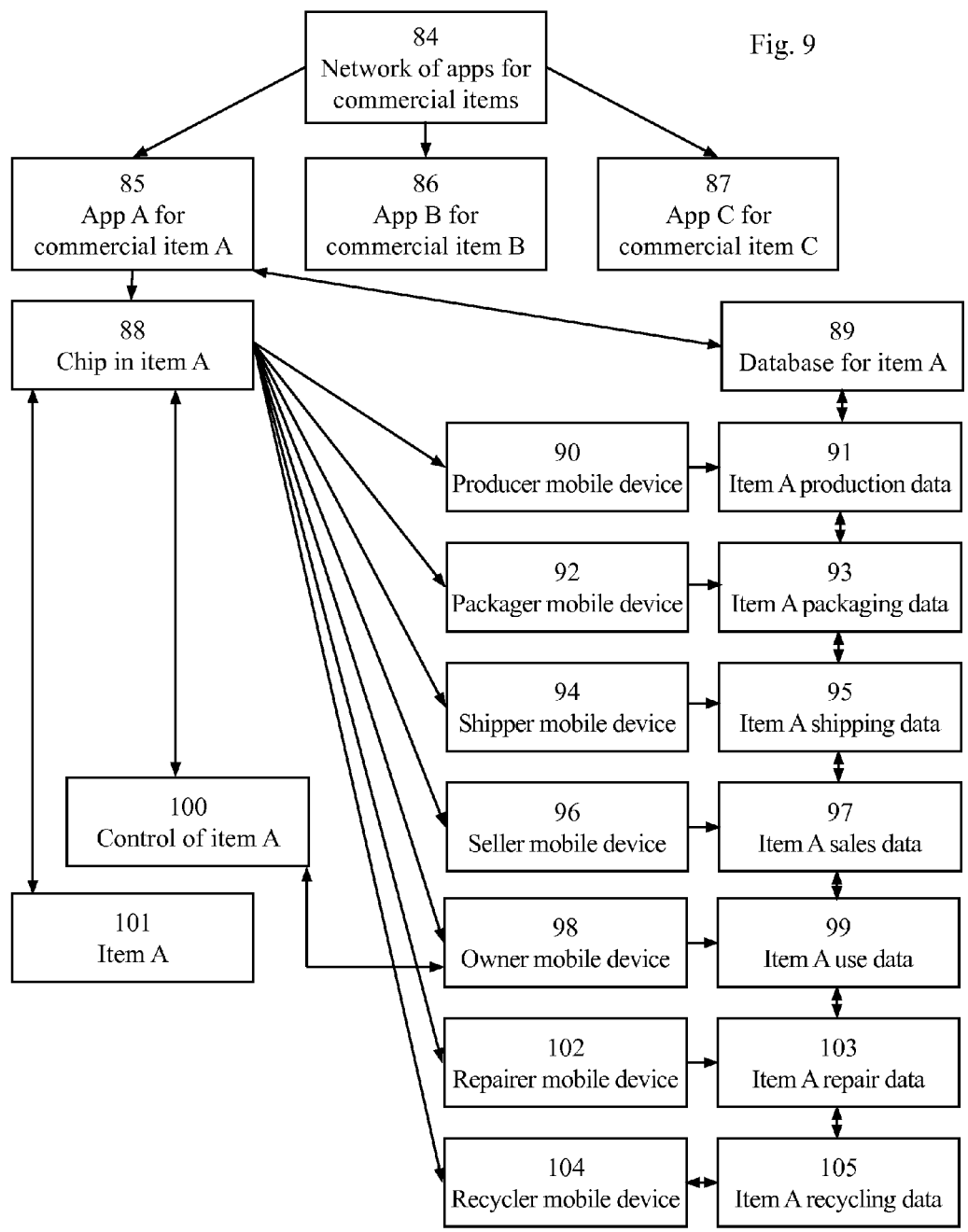
FIG. 9 shows a block diagram of an even yet further still modified method for providing a coherent network of apps for mobile computerized devices in which apps are provided for individual consumer items.

In FIG. 1, there is shown a block diagram of a method for providing a coherent network of apps for mobile computerized devices in which an app generator 2, a program that provides a common infrastructure to every app that it creates, is used by App A creator 9 to create an App A database 4 and to make App A available on an app store 1. Other app creators use the app generator 2 to create an App B database 5 and an App C database 6. App A database 4, App B database 5, and App C database 6 are all accessible to a master directory 3, which can read and process all the data on all databases within the network, but which does not control or edit the data. A user of an end user device 13 chooses to install one of apps A, B , or C, and in this case, chooses to install App A in step 8 onto the end user device 13 and to open App A in step 14, receiving any and all content for App A. As the end user device 13 moves physically or navigates on a map or navigates to a new date on a calendar, step 11 occurs, in which the master directory 3 suggests Apps that are relevant to the user's real or virtual location and time, with listings filtered by tip ratings. The user can then see app suggestions 15, which might include suggestions that App B or App C are now relevant to the user. The end user device 13 can then access, through master directory 3, any and all data from App B or App C in step 16, as if App B or App C had been installed on the end user device 13, but without requiring that App B or App C be actually downloaded from the app store 1. The user can then choose to tip, make a donation to, or make a purchase or payment to one of the app creators, and, in this instance, in step 17, the user has chosen to tip or make a payment to App A creator 9, which goes through a payment service 7. In step 12, the payment is transferred to App A creator 9 and records of the transaction are sent to the master directory 3. When such a payment includes a tip or donation, the master directory 3 uses this information each time step 11 occurs, listing suggested apps according to the number and/or total amount of such tips and donations that each app creator has received; and In FIG. 2, there is shown a block diagram of a modified method for providing a coherent network of apps for mobile computerized devices in which an app generator 2, a program that provides a common infrastructure to every app that it creates, is used by State A agency 24 to create a State A app database 18 and to make State A app available on an app store 1. State A agency 24 might be a cultural affairs department, an arts council, a parks department, a health department, an education department, an economic development department, a tourism department, a state historical society, an agricultural department, a rural development department, or a hunting and fishing department. State agencies from other states use the app generator 2 to create a State B app database 19 and a State C app database 20. State A app database 18, State B app database 19, and State C app database 20 are all accessible to a master directory 3, which can read and process all the data on all databases within the network, but which does not control or edit the data. A user of an end user device 13 chooses to install one of state A, state B, or state C apps, and in this case, chooses to install State A app in step 23 onto the end user device 13 and to open State A app in step 30, receiving any and all content for State A app. As the end user device 13 moves physically or navigates on a map or navigates to a new date on a calendar, step 11 occurs, in which the master directory 3 suggests Apps that are relevant to user's real or virtual location and time, with listings filtered by tip ratings. The user can then see app suggestions 31, which might include suggestions that State B app or State C app are now relevant to the user. The end user device 13 can then access, through master directory 3, any and all data from State B app or State C app in step 32, as if State B app or State C app had been installed on the end user device 13, but without requiring that State B app or State C app be actually downloaded from the app store 1. In particular, when a user travels to state A, B, or C, the relevant app for that state will be suggested and made accessible to the end user device 13. Likewise, when the user navigates to state A, state B, or state C on a map on the end user device 13, the relevant app for that state will be suggested, no matter which state's app has been installed and opened. In step 26, State A agency invites individual venues within State A to create their own apps using the app generator 2. Each participating state can likewise do so, inviting venues such as cultural attractions, parks, museums, galleries, restaurants, historical attractions, zoos, schools, theaters, music venues, retail shops, farmer's markets, grocery stores, bars, and clubs. Venue A 27 creates its own app and the venue A app database 21. Venue B 28 creates its own app and the venue B app database 22. From the state A app, listings for venue A 27 and/or venue B 28 appear within the suggestions when the user navigates, physically or virtually to the part of the state where venue A 27 is located and/or where venue B 28 is located. The end user device 13 can then access, through master directory 3, any and all data from venue A app or venue B app in step 33, as if venue A app or venue B app had been installed on the end user device 13, but without requiring that venue A app or venue B app be actually downloaded from the app store 1. The user can then choose to tip, make a donation to, or make a purchase or payment to venue A 27 or venue B 28, and, in this instance, in step 34, the user has chosen to tip or make a payment to venue B 28, which goes through a payment service 7. In step 29, the payment is transferred to venue B 28 and records of the transaction are sent to the master directory 3. When such a payment includes a tip or donation, the master directory 3 uses this information each time step 11 occurs, listing suggested apps according to the number and/or total amount of such tips and donations that each app creator has received; and In FIG. 3, there is shown a block diagram of a further modified method for providing a coherent network of apps for mobile computerized devices in which an app generator 2, a program that provides a common infrastructure to every app that it creates, is used by State A agency 24 to create a State A app database 18 and to make State A app available on an app store 1. State A agency 24 might be a cultural affairs department, an arts council, a parks department, a health department, an education department, an economic development department, a tourism department, a state historical society, an agricultural department, a rural development department, or a hunting and fishing department. In step 26, State A agency invites individual venues within State A to create their own apps using the app generator 2, inviting venues such as cultural attractions, parks, museums, galleries, restaurants, historical attractions, zoos, schools, theaters, music venues, retail shops, farmer's markets, grocery stores, bars, and clubs. Venue A 27 creates its own app and the venue A app database 21. Venue B 28 creates its own app and the venue B app database 22. App databases 18, 21, and 22 are all accessible to a master directory 3, which can read and process all the data on all databases within the network, but which does not control or edit the data. A user of an end user device 13 chooses to install State A app in step 23 onto the end user device 13 and to open State A app in step 30, and in step 35 the user can see data from venues that have been invited by state A agency 24 to create their own apps, but with such data being limited in scope and prefiltered by state A agency 24. As the end user device 13 moves physically or as the user navigates on a map or navigates to a new date on a calendar, step 11 occurs, in which the master directory 3 suggests apps that are relevant to the user's real or virtual location and time, with listings filtered by tip ratings. The user can then see app suggestions 31, which might include suggestions that venue A app or venue B app are now relevant to the user. The end user device 13 can then access, through master directory 3, any and all data from venue A app or venue B app in step 33, as if venue A app or venue B app had been installed on the end user device 13, but without requiring that venue A app or venue B app be actually downloaded from the app store 1. In particular, from the state A app, listings for venue A 27 and/or venue B 28 appear within the suggestions when the user navigates, physically or virtually to the part of the state where venue A 27 is located and/or where venue B 28 is located. The end user device 13 can then access, through master directory 3, any and all data from venue A app database 21 or venue B app database 22. The user can then choose to tip, make a donation to, or make a purchase or payment to venue A 27 or venue B 28, and, in this instance, in step 34 the user has chosen to tip or make a payment to venue B 28, which goes through a payment service 7. In step 29, the payment is transferred to venue B 28 and records of the transaction are sent to the master directory 3. When such a payment includes a tip or donation, the master directory 3 uses this information each time step 11 occurs, listing suggested apps according to the number and/or total amount of such tips and donations that each app creator has received; and In FIG. 4, there is shown a block diagram of a still further modified method for providing a coherent network of apps for mobile computerized devices in which an app generator 2, a program that provides a common infrastructure to every app that it creates, is used by App A creator 9 to create an App A database 4 and to make App A available on an app store 1. Other app creators use the app generator 2 to create an App B database 5 and an App C database 6. App A database 4, App B database 5, and App C database 6 are all accessible to a master directory 3, which can read and process all the data on all databases within the network, but which does not control or edit the data. A user of an end user device 13 chooses to install one of apps A, B , or C, and in this case, chooses to install App A in step 8 onto the end user device 13 and to open App A in step 14, receiving any and all content for App A. In step 36, the user chooses fields of interest and disinterest and the content of app A is filtered to favor those interests and disfavor those disinterests. As the end user device 13 moves physically or the user navigates on a map or navigates to a new date on a calendar, step 11 occurs, in which the master directory 3 suggests apps that are relevant to the user's real or virtual location and time, with listings filtered by tip ratings and by the user's interests. The user can then see app suggestions 15, which might include suggestions that App B or App C are now relevant to the user. The end user device can then access, through master directory 3, any and all data from App B or App C in step 16, as if App B or App C had been installed on the end user device 13, but without requiring that App B or App C be actually downloaded from the app store 1. The user can then choose to tip, make a donation to, or make a purchase or payment to one of the app creators, and, in this instance, the user has chosen to tip or make a payment to App A creator 9 in step 17, which goes through a payment service 7. In step 12, the payment is transferred to App A creator 9 and records of the transaction are sent to the master directory 3. When such a payment includes a tip or donation, the master directory 3 uses this information each time step 11 occurs, listing suggested apps according to the number and/or total amount of such tips and donations that each app creator has received; and In FIG. 5, there is shown a block diagram of a yet still further modified method for providing a coherent network of apps for mobile computerized devices in which an app generator 2, a program that provides a common infrastructure to every app that it creates, is used by multiple app creators. For instance, App A creator 9 creates an App A database 4 and makes App A available on an app store 1. Other app creators use the app generator 2 to create an App B database 5 and an App C database 6. App A database 4, App B database 5, and App C database 6 are all accessible to a master directory 3, which can read and process all the data on all databases within the network, but which does not control or edit the data. A user of an end user device 13 chooses to install one of apps A, B, or C, or in this case, the user has chosen to install a master app in step 37, which is a primary overview of the entire network of apps. The user installs the master app on the end user device 13 and, in step 38, opens the master app. As the end user device 13 moves physically or as the user navigates on a map or navigates to a new date on a calendar, step 11 occurs, in which the master directory 3 suggests apps that are relevant to the user's real or virtual location and time, with listings filtered by tip ratings. The user can then see app suggestions 15, which might include suggestions that App A, App B, or App C are now relevant to the user. The end user device can then access, in step 16, through master directory 3, any and all data from App A, App B and/or App C, as if App A, App B and/or App C had been installed on the end user device 13, but without requiring that App A, App B and/or App C be actually downloaded from the app store 1. The user can then choose to tip, make a donation to, or make a purchase or payment to one of the app creators, and, in this instance, the user has chosen in step 17 to tip or make a payment to App A creator 9, which goes through a payment service 7. In step 12, the payment is transferred to App A creator 9 and records of the transaction are sent to the master directory 3. When such a payment includes a tip or donation, the master directory 3 uses this information each time step 11 occurs, listing suggested apps according to the number and/or total amount of such tips and donations that each app creator has received; and In FIG. 6, there is shown a block diagram of an even still further modified method for providing a coherent network of apps for mobile computerized devices in which a Network Creator 39 invites multiple states to create apps within the network as in step 40, step 41, and step 42. In turn, the states can invite local governments and agencies to create apps within the network as in steps 44 through 48. These local governments and agencies as well as the states can also invite individual venues to create apps as in steps 49 through 59; and In FIG. 7, there is shown a block diagram of an even yet further still modified method for providing a coherent network of apps for mobile computerized devices in which a Network Creator 39 invites people, governments, and companies to create apps within the network as in steps 60 through 62, and these people, governments, and companies in turn invite local organizations and individuals to create apps within the network as in steps 63 through 68 and in steps 73, 75, 76, 77, and 79. Subsequently, these local organizations and individuals invite others to create apps within the network as in steps 69 through 72 and steps 74 and 78; and In FIG. 8, there is shown a block diagram of a yet even further modified method for providing a coherent network of apps for mobile computerized devices in which an app generator 2, a program that provides a common infrastructure to every app that it creates, is used by App A creator 9 to create an App A database 4 and to make App A available on an app store 1. Other app creators use the app generator 2 to create an App B database 5 and an App C database 6. App A database 4, App B database 5, and App C database 6 are all accessible to a master directory 3, which can read and process all the data on all databases within the network, but which does not control or edit the data. A user of an end user device 13 chooses to install one of apps A, B , or C, and in this case, chooses to install App A in step 8 onto the end user device 13 and to open App A in step 14, receiving any and all content for App A. In step 80, the master directory 3 provides to the end user device 13 listings of sub-networks of apps that each contain apps that are relevant to a particular field of interest. In step 81, the user accesses the list of sub-networks of apps, and in step 82, chooses a sub-network. In step 83, the user chooses App C from sub-network Q and opens App C without having to download and install App C. In this way, any app within any sub-network can be opened by the user; and In FIG. 9, there is shown a block diagram of a yet further modified method for providing a coherent network of apps for mobile computerized devices in which apps are provided for individual consumer items. A network of apps for commercial items 84 creates App A for commercial item A 85, App B for commercial item B 86, and App C for commercial item C 87. App A for commercial item A 85 is paired with a computerized chip 88 embedded in item A 101, and a database for item A 89 is created. In step 90, a mobile device in possession of the producer of item A 101 communicates with the chip 88 in item A 101 and in step 91, sends production data such as the date, location, and materials used to the database for item A 89. In step 92, a mobile device in possession of the packager of item A 101 communicates with the chip 88 in item A 101 and in step 93, sends packaging data such as the date, location, and materials used to the database for item A 89. In step 94, a mobile device in possession of the shipper of item A 101 communicates with the chip 88 in item A 101 and in step 95, sends shipping data such as the date, location, and method of shipping to the database for item A 89. In step 96, a mobile device in possession of the seller of item A 101 communicates with the chip 88 in item A 101 and in step 97, sends sales data such as the date, location, amount of time left on the shelf, sale price, and sales date to the database for item A 89. In step 98, a mobile device in possession of the owner of item A 101 communicates with the chip 88 in item A 101 and in step 99, sends data such as the date, location, usage, reviews, and comments to the database for item A 89. In step 100, the owner mobile device 98 takes remote control of item A 101 by communicating with the chip 88 in item A 101. In step 102, a mobile device in possession of a repairer of item A 101 communicates with the chip in item A 88 and in step 103, sends and receives data to and from the database for item A 89, receiving repair instructions and sending repair details. In step 104, a mobile device in possession of the recycler of item A 101 communicates with the chip 88 in item A 101 and in step 105, sends and receives data to and from the database for item A 89, receiving recycling instructions and sending recycling details. Others who might use mobile computerized devices to communicate with the chip in item A 88 but are not shown in FIG. 9 can include a quality control worker, a wholesaler, an inspection agent, an authorized law enforcement agent, a stocker in a store, an inventory taker in a store, a deliverer of the item, an installer of the item, a person interested in buying item A 101 as a used item, a reseller, and a disposer; and In FIG. 10, there is shown a block diagram of a yet even further still modified method for providing a coherent network of apps for mobile computerized devices in which a network creator 39 creates apps that are compatible with the network, taking data from existing apps, websites, social media pages, and blogs. In step 106, App A is created by taking data from blog A, and in step 107, the owner of blog A activates and publishes the new app. In step 108, the owner of App A has chosen to update App A directly and to have the network automatically send updates to blog A, so it stays current with App A. In step 109, App B is created by taking data from website B, and in step 110, the owner of website B activates and publishes the new app. In step 111, the owner of website B has chosen to update website B instead of App B and to have the network automatically update App B based on changes made to website B. In step 112, App C is created by taking data from social media page C, and in step 113, the owner of social media page C activates and publishes the new app. In step 114, the owner of social media page C has chosen to update social media page C instead of App C and to have the network automatically update App C based on changes made to social media page C. In step 115, App D is created by taking data from existing app E, and in step 116, the owner of existing app E activates and publishes the new app. In step 117, the owner of existing app E has chosen to update App D directly and to have the network automatically send updates to existing app E, so it stays current with App D.

I claim:

1. A network of apps for mobile computerized devices, including in combination:
    at least one computer comprising a computer processor and a memory;
    multiple apps that have been created with standardized coding that is compatible with all said apps within, said network of apps;
    at least one computerized program that allows at least one app creator to create said apps with standardized coding that is common to all said anus within said network of apps;
    at least one directory that indexes all said apps within said network;
    a programmed accessing and interaction function that provides a user of said network access to and interaction with the content of multiple said apps that are a part of said network, without requiring said user to separately download and install each of said multiple apps;
    and wherein said programmed accessing and interaction function that provides said user access to and interaction with said content of multiple said apps is encoded into at least one of the following: each of said apps, a master app for said network pre-installed on said mobile computerized devices, a master app for said network that is downloaded and installed from an app store by said user onto said mobile computerized devices, a master app for said network that is downloaded and installed from a website by said user onto said mobile computerized devices, at least one of said apps that are each available for download from an app store, at least one of said apps that are each available for download from a website, at least one of said apps that is pre-installed on said mobile computerized devices, at least one of said apps that is created by said user and installed on said user's said mobile computerized device, at least one of said apps that is created by said user and stored on a computerized chip that is attached to an object, each of said apps that are created by said network and stored on computerized chips that are attached to objects, said mobile computerized devices, a computerized chip that can be inserted into said mobile computerized devices, a network of computerized chips that are spatially distributed, and at least a second computerized device in communication with said mobile computerized devices.

2. The combination according to claim 1 wherein each creator of each said app can separately add content to, delete content from, and fully control the content of their respective said apps, storing said content on separate servers, and providing said content directly to said mobile computerized devices.

3. The combination according to claim I wherein said network employs a universal tagging system that allows coherent metadata to be added to all said apps and to all said apps' content in order to facilitate coherent navigation and filtering of all said apps and all said apps' content;
    and wherein at least one filtering program running in conjunction with said network can determine and suggest to said user the said apps and said apps' content within said network that might be most relevant to said user based on at least one of the following: said user's proximity to a particular location, said user's proximity to a particular virtual location, said user's proximity to a person, the current time, a time other than the present chosen by said user, a place other than the said user's current location as chosen by said user, said user's current location and time, said user's location, said user's movement and speed of movement, a place and time other than the present time and said user's current location as chosen by said user, said user's selection of a particular physical object, said user's selection of a particular commercial item, object recognition of objects near said user, said user's selection of a particular person, weather conditions near said user, emergency alerts for locations near said user, the environmental conditions around said user, said user's heart rate, said user's body temperature, said user's body position, said user's proximity to a physical object, said user's proximity to a commercial item, 3D mapping of a space that said user is within, a search initiated by said user, recommendations from the public, recommendations from a group, recommendations from a governmental agency, mandatory alerts, recommendations from at least one business, recommendations from a business said user is visiting, recommendations from at least one friend of said user, the public ratings of said apps, the critical ratings of said apps, ratings of said apps determined by the amount and number of tips and donations given in the name of said app, said user's selection of which types of apps said user prefers to access at the current time, said user's selection of which types of apps said user prefers to access at a pre-specified time, said user's selection of which types of apps said user prefers to access at a pre-specified place, said user's selection of which types of apps said user generally prefers to access, and a profile of said user that predicts which types of apps said user prefers to access;

and wherein at least one of the following functions is coded into at least one said app and is coordinated with said at least one directory and said at least one filtering program: a search function for at least one particular said app within said network, at least one navigable menu of said apps within said network, a master list of said apps within said network, at least one list of automated suggestions of said apps within said network determined to be currently relevant to said user, and automated opening of a said app within said network determined to be currently relevant to said user;

and wherein each of said functions coded into each said app provides a means for said user of any one said app access to at least one piece of content from at least one other said app that is a part of said network.

4. The combination according to claim 1 wherein at least one sub-network of said network of apps is limited to only said apps that have been created by one of the following: an individual, a group of individuals, a single company, a group of companies, a government, a network of governments, a government agency, a network of government of agencies, a non-profit organization, and a network of non-profit organizations.

5. The combination according to claim 1 wherein at least one sub-network of said network of apps is created as a social media network;

and wherein at least one member of said sub-network can select from said apps on said network of apps and choose to post specific said apps to share on said sub-network;

and wherein said at least one member can create new said apps to post on said sub-network.

6. The combination according to claim 1 wherein at least one sub-network of said network of apps is created by a member of said network;

and wherein said subnetwork is a compilation of a select and limited number of said apps on said network of apps;

and wherein said member can add comments and new content to accompany at least one listing of one of said apps so selected;

and wherein said member is one of the following: an individual, a group of individuals, a single company, a group of companies, a government, a network of governments, a government agency, a network of government of agencies, a non-profit organization, and a network of non-profit organizations.

7. The combination according to claim 1 wherein at least one sub-network of said network of apps is limited to only said apps that have been created by a member of said network;

and wherein an app for said sub-network includes at least one line of code that is not standard to said network;

and wherein said sub-network requires said user to install said app for said sub-network in order for said sub-network to be compatible with said network;

and wherein said member is one of the following: an individual, a group of individuals, a single company, a group of companies, a government, a network of governments, a government agency, a network of government of agencies, a non-profit organization, and a network of non-profit organizations.

8. The combination according to claim 1 wherein at least one of the following; an individual, a group of individuals, a single company, a group of companies, a government, a network of governments, a government agency, a network of government of agencies, a non-profit organization, and a network of non-profit organizations can invite specific institutions, organizations, businesses, and individuals to create said apps to be part of a sub-network within said network.

9. The combination according to claim 1 wherein said multiple app creators first receive invitations from an organization to create said apps;

and wherein said multiple app creators can each invite others to become app creators and have their apps included within said network;

and wherein said invitations can be extended by any and all said app creators;

and wherein said apps cannot be created by those who are not invited by said organization or one of said app creators.

10. The combination according to claim 1 wherein multiple state-run organizations are invited to create said apps;

and wherein said multiple state-run organizations can invite businesses, organizations, and individuals within their respective states to create said apps;

and wherein said state-run organizations can invite regional and local organizations and governments within their respective states to create said apps;

and wherein said local and regional organizations and governments can invite businesses, organizations, and individuals within their communities to create said apps;

and wherein said state-run organizations control what content from said apps within said network are featured on their own state-run apps;

and wherein said local and regional organizations and governments control what content from said apps within said network are featured on their own said apps.

11. The combination according to claim 1 wherein said user can give monetary tips, digitally transferring funds to at least one of said app creators;

and wherein such said tips are used to calculate and positively effect the ratings of said apps that have been so tipped.

12. The combination according to claim l wherein some of said apps are only accessible to said user under at least one of the following circumstances: during a specific period of time set by each of the said multiple app creators, when said user searches for apps relevant to a specific period of time, when said user selects apps that are relevant to a specific period of time from a menu, and when said user navigates on a virtual calendar on one of said mobile computerized devices to a specific period of time set by each of the said multiple app creators;

and wherein said specific period of time can have a set activation and expiration date and can also be set to recur at one of the following intervals: annually, monthly, weekly, at a specific time daily, at multiple specific times daily, and at random intervals.

13. The combination according to claim 1 wherein specific content from each said app can also be published, with its said content kept current, to at least one of the following: at least one social media website, at least one website, at least one other existing app, at least one social media page, at least one social media app, at least one portal website, at least one consumer guide website, at least one consumer guide app, at least one travel guide website, at least one travel guide app, at least one encyclopedic website, at least one encyclopedic app, a blog website, and at least one searchable database.

14. The combination according to claim 1 wherein each said app can include rules that allow and limit access to said app to at least one of the following populations: the general public, only members of an organization, only individuals who register with said app, only a specific group of people, only employees of a company, only people who have been given specific rights to access said app, only those who pass a biometric test that determines authorization to access said app, only those who are in a specified location, only those who scan a specific bar code, only those who scan a specific QR code, only those whose said mobile device communicates with a close-proximity wireless device associated with said app, only those whose said mobile device communicates with a close-proximity wireless device embedded in an object associated with said app, only people who are members of said network, only people who have earned a reputation as trusted members of said network, and only people who have purchased the right to access said app.

15. The combination according to claim 1 wherein said at least one computerized program is capable of converting at least one of the following into one of said apps: a website, a web page, a social media page, an existing app;

and wherein said apps that have been converted from a website/web page/social media page/existing app are programmed to display current and updated content as said content changes over time on said websites/web pages/social media pages/existing apps.

16. The combination according to claim 1 wherein said network of apps is limited to apps that are dedicated to one of the following: a specific aspect of human experience, a specific type of place, a specific type of event, a specific type of media, a specific genre of media, media with a specific aesthetic, a specific type of news, a specific type of business, a specific type of public venue, a specific type of service, a specific aspect of nature, a specific type of person, a specific group of people, a religion, a nation, a region, a state, a city, a specific type of activity, a specific period of time, a specific aspect of politics, a specific type of commercial item, nature, people, activities, events, places, a specific type of business, public venues, services, politics, health, news, religion, and commercial goods.

17. The combination according to claim 1 wherein at least one said app that is accessible through said network of apps is not made available for separate download and installation.

18. The combination according to claim 1 wherein each said app is dedicated to a specific subject;

and wherein members of said network can add relevant content to each said app;

and wherein at least one editor for each said app can edit said relevant content that has been added to each said app.

19. The combination according to claim 1 wherein said apps are each created for a specific commercial item;

and wherein one of said apps can be accessed on one of said mobile computerized devices under at least one of the following conditions: when a user enters a product code, when one of said mobile computerized devices is connected by way of a data transfer cord to a computerized device associated with said specific commercial item, when one of said mobile computerized devices scans a bar code associated with said specific commercial item, when one of said mobile computerized devices scans a QR code associated with said specific commercial item, when one of said mobile computerized devices communicates with a close-proximity wireless device associated with said specific commercial item, when one of said mobile computerized devices communicates with a close-proximity wireless device embedded within said specific commercial item, and when one of said mobile computerized devices communicates with a close-proximity wireless device attached to said specific commercial item.

20. The combination according to claim 1 wherein at least one of said apps has a separate database for its own said content;

and wherein a master directory for said network of apps can read and provide access to all the said content on each said separate database;

and wherein said master directory cannot edit said content on each said separate database.

* * * * *